Feb. 22, 1966   H. SCHNELL ETAL   3,236,416
APPARATUS FOR THE INTERMITTENT PRODUCTION OF MOULDED ARTICLES OF
SYNTHETIC RESINS FROM LIQUID, RAPIDLY-SOLIDIFYING MIXTURES
Filed Nov. 22, 1963
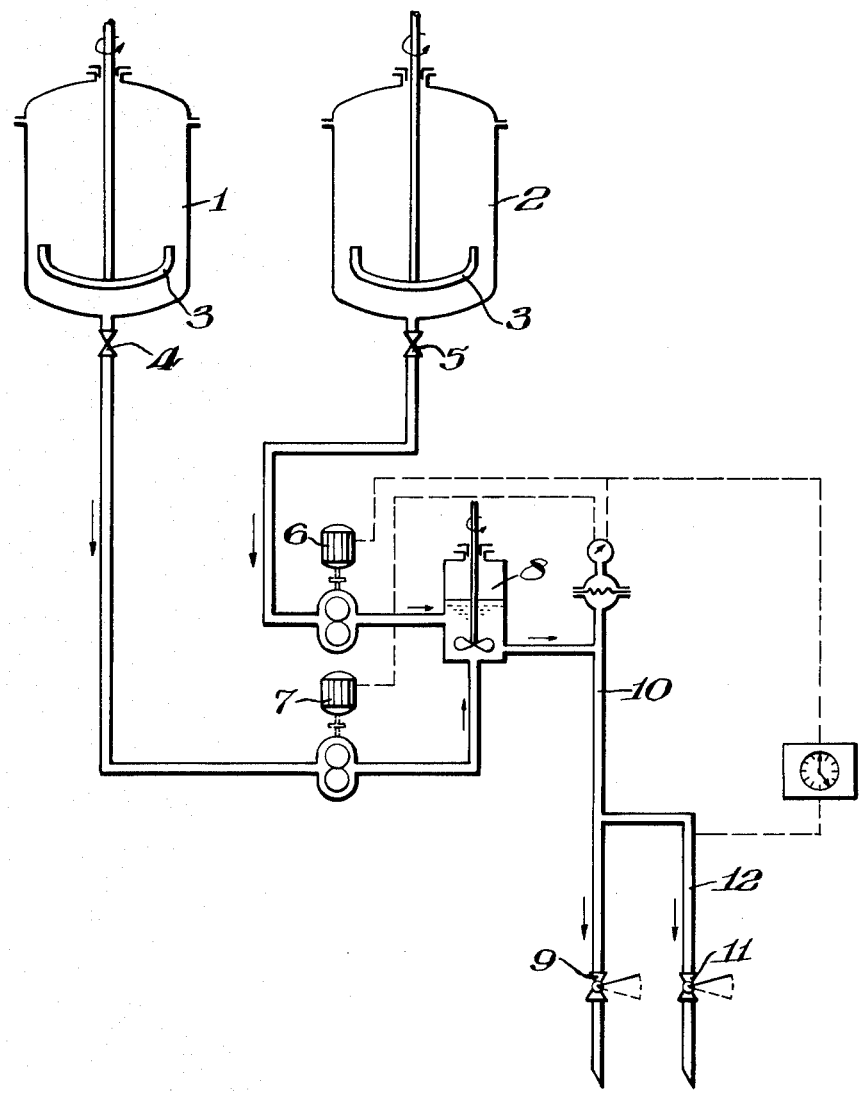
INVENTORS:
HERMANN SCHNELL, KARL ROSENKÖTTER, GERHARD FRITZ.
BY
Connolly and Hutz
ATTORNEYS

3,236,416
APPARATUS FOR THE INTERMITTENT PRODUCTION OF MOULDED ARTICLES OF SYNTHETIC RESINS FROM LIQUID, RAPIDLY-SOLIDIFYING MIXTURES
Hermann Schnell, Krefeld-Uerdingen, and Karl Rosenkotter and Gerhard Fritz, Krefeld-Bockum, Germany, assignors to Farbenfabriken Bayer Aktiengesellschaft Leverkusen, Germany, a corporation of Germany
Filed Nov. 22, 1963, Ser. No. 325,533
Claims priority, application Germany, Nov. 29, 1962, F 38,415
1 Claim. (Cl. 222—52)

The present invention is concerned with an apparatus for the intermittent production of moulded articles of synthetic resins from liquid, rapidly-solidifying mixtures.

In many cases, moulded articles of synthetic resins can be produced by combining two or more components, which are liquid at room temperature or at higher temperatures, to form mixtures which become solid only a short time after combination of the components, be it again at room temperature or at higher temperatures, and moulding these mixtures while still in a liquid state, for example, by continuous extrusion or spraying on to substrates or by impregnation of fibre strips or strands, or by a passage, during solidification, through calibration nozzles or tubes or the like.

Typical materials for this purpose are synthetic resins which are formed by the addition of catalysts and possibly of accelerators to monomeric starting materials by polymerization or copolymerization, or after the addition of cross-linking agents to linear polymers by cross-linking, whereby, for example, catalysts can be added to one of the synthesis components and possibly accelerators to another synthesis component, or catalysts and accelerators can be divided between different batches of one and the same synthesis component, and the individual amounts can then be mixed.

For this purpose, continuously operating dosing devices can be used which continuously convey the components, catalysts or accelerators in suitable proportions from storage vessels to a mixing device and again continuously convey the mixture formed therein to the moulding process. By adjusting to the reactivity of the mixture, the residence period of the mixtures in the mixing device and in the possibly connected containers, pipes and the like, and possibly by adjusting the temperature, a smooth working is usually possible, without especial difficulties.

However, the matter is quite different when it is desired to produce moulded articles intermittently, for example, by filling individual moulds or groups of moulds, where the flow of the mixtures, it it is not desirable or possible first to produce these in the moulds themselves, is frequently interrupted and their residence time consequently varies considerably, especially when the mixing does not proceed synchronously with the consumption of the mixtures. This can then not only result in the solidification of the mixtures already in the pipes or in the mixing device, but also in the ingress of air and thus in bubble formation and possibly in chemical damage of the masses.

The present invention is concerned with an especially advantageous device for the intermittent production of moulded articles of synthetic resins from liquid, rapidly-solidifying mixtures and will be described with reference to the accompanying drawings.

The device according to the present invention consists of at least two storage containers of the same or different size, which may be heatable (see, for example, 1 and 2 in the figure), for the liquid starting components or auxiliary materials and which are provided with a stirrer 3 in order to keep their contents to be moved, the outlets of which (for example, 4 and 5) are each provided with dosing pumps (for example, 6 and 7) which may be heatable and which are adjusted to the desired mixing ratio of the components and the desired filling rate of the moulds, of a mixing device 8, possibly heatable and supplied from the storage containers via the dosing pumps with the components, and which stands under liquid pressure, and of an outlet pipe 10 which can be moved from this mixing device towards the moulds, and is provided at the end with a shut-off device 9, the liquid pressure in the mixing device and in the outlet pipe being regulated by the pressure to which are adjusted either (a) the dosing pumps or (b) the shut-off device.

According to method (a) of operating the device, the dosing pumps (for example 6 and 7) work with the closed shut-off device 9 untitl the liquid pressure is reached in the mixing device 8 and its outlet 10 to which the dosing pumps are adjusted. Upon filling a mould by opening the shut-off device 9, the pressure in the outlet 10 and in the mixing device 8 decrease, whereby the function of the pumps is initiated and continues until, after sufficient filling of the mould, the shut-off device 9 is again closed and the liquid pressure in the outlet 10 and in the mixing device 8 has thereby again reached the previously adjusted pressure. The outlet pipe 10 can then be placed over the opening of another mould and the filling of this mould takes place in the same way.

According to method (b) of operating the device, the shut-off device 9 is adjusted in such a manner that it only opens a previously determined liquid pressure but closes again upon falling below this pressure. At the same time, the dosing pumps (for example 6 and 7) are adjusted to the passage of specified amounts of liquid which, in turn, correspond to the filling volume of an individual mould to be filled with the mixture. If the pressure determined by the shut-off device 9 is reached in the outlet pipe 10 and in the mixing device 8, then the shut-off device 9 opens, so that the mixture runs into the mould. When the mould is full, the action of the dosing pumps stops, the pressure in the mixing device 8 and the outlet pipe 10 falls and the shut-off device 9 closes again. By again switching on the dosing pumps, the pressure in the mixing device 8 and in the outlet pipe 10 necessary for the opening of the shut-off device 9 is again reached, whereby, after suitable adjustment of the outlet pipe 9, the next mould can be filled.

In order to ensure an especially rapid reaction of the dosing pumps or of the shut-off device to pressure changes, pressure detectors and relays can be built in a known manner for the control of these devices.

If the moulding is to be interrupted for a prolonged period of time so that provision must be made that the mixing device 8 and the outlet pipe 10 no longer remain filled with hardenable mixture, then the device is to be supplemented in such a manner that at the end of the filling step, one dosing pump continues the supplying, and the content of the mixing device 8 and of the outlet pipe 10 is discharged through a second shut-off device 11 which is connected with the outlet pipe 10 through a pipe 12, and thus the hardenable mixture is rinsed out from the mixing device 8 and the outlet pipe 10 with the components which do not harden by themselves.

Thus, according to method (a) of operating the device described above, only one of the two dosing pumps 6 and 7 stops upon closure of the shut-off device 9, while the other continues to function until the higher liquid pressure is reached to which the shut-off device 11 is adjusted. The latter then opens and the mixing device 8 and the outlet pipe 10 are, as described, rinsed out.

In contrast, according to method (b) of operating the device, only one of the two dosing pumps 6 and 7, for example, is adjusted to a specified amount of supply, while the other continues to function. In this case, too, the pressure decreases in the mixing device 8 and the outlet pipe 10, whereby the shut-off device 9 closes. However, at the same time, the shut-off device 11 opens so that the still functioning dosing pump further supplies the components which do not harden by themselves, through the mixing device 8, the outlet pipe 10 and the connecting piece 12, thus rinsing these out.

The following example is given for the purpose of illustrating the present invention:

Example

For the moulding of polyamide semi-finished material, the following moulds are successively filled:

Mould (I)[1] 1 round rod $\phi$125 mm.
  Length 130 mm.  V=16 liters
Mould (II)[1] 1 plate___400×800×100 mm. V=32 liters
Mould (III)[1]
  1 parallelepiped
    block_____200×200×400 mm. V=16 liters Load_____64 liters
Excess for rinsing and pre-running_____ 3 liters Total amount of lactam_____67 liters

[1] Not shown in the drawing.

The supply ratio of the pumps 7 and 6 is fixed at 3:1.

Vessel 1 (capacity 75 liters) is charged with 50 kilograms caprolactam and vessel 2 (capacity 25 liters) with 17 kilograms caprolactam and 409 milliliters 2.9 N sodium methylate solution (0.2 mol percent). Both vessels are evacuated three times and aerated with nitrogen. Both vessels are then evacuated to 30 millimeters Hg, heated to 150° C., the melts stirred for 2 hours and then cooled to 125° C. The vacuum is released with nitrogen and 935 grams (0.4 mol percent) hexamethylene diisocyanate are placed in vessel 1 and stirred for 10 minutes. The dosing pump 7 is adjusted to 170 revolutions, corresponding to a supply capacity of 12 kilograms within 2 minutes, and the dosing pump 6 to 200 revolutions, corresponding to a supply capacity of 4 kilograms within 2 minutes. The two bottom valves 4 and 5 of the vessels and the rapid-closure valve 9 are opened and the pumps 7 and 6 switched on at the same time. The preheated outlet pipe 10 is raised until it is filled with caprolactam melt and the mixing top motor for 8 is switched on. About 200 grams of melt are rejected. The mould I, heated to 140° C., is subsequently filled, ingress of air being avoided by passing over nitrogen.

Between second shutoff 11 and pump 6 is for example a two minute timer which is reset by a lower pressure. Thus, for example, 2 minutes after the commencement of the filling step, the pumps 7 and 6 automatically switch off and the rapid-closure valve 9 closes. The bottom valve of the mixing device 8 is opened in order to discharge the remaining active melt. The teamed mould is now moved aside and the mould II, heated to 130° C., prepared for the final cast. The registers of the dosing pumps 7 and 6 are now adjusted to 400 and 340 revolutions, respectively, corresponding to a supply capacity of 24 and 8 kilograms, respectively, per 4 minutes.

After closing the bottom valve of the mixing device, switching on the mixing stirrer for 8 and discharge of first runnings of about 200–300 grams, the filling step is repeated as described.

The mould III, heated to 120° C., is filled with the same adjustment of the dosing pump as in the case of mould I; the steps between the filling of mould II and III are repeated as described.

The residual, catalyst-containing melt remaining in the vessel 2 after the filling of mould III, is discharged by opening the rapid-closure valve 9 and switching on the dosing pump 6, the rapid closure valve 9 closes, pump 7 is switched on and the mixing device is rinsed with the melt remaining in vessel 1.

After emptying both vessels, the bottom valves 4 and 5 are closed, the mixing top motor is switched off and the bottom valve of the mixing head is opened.

The caprolactam melt in the filled moulds becomes viscous about 1 minute after filling and after 2 minutes begins to polymerize, whereby the mould temperature increases. The heating of the moulds is switched off after one hour.

We claim:

An apparatus for intermittently supplying fluid, rapidly-solidifying raw material mixtures to molds during the production of molded articles of synthetic resins comprising at least two storage means for storing the individual starting components for the raw material mixture, separate discharge means connected with each of said storage means, mixing means connected with said discharge means to receive and mix the starting components, separate dousing pump means connected with each of said supply means adjusted to feed the stored components in a desired mixing ratio and a desired filling rate for the molds, a mixing means discharge conduit, shut-off means connected with said discharge conduit, said supply means, mixing means and discharge conduit being under fluid pressure, the dousing pump means and shut-off means being interdependent in operation upon said fluid pressure, the dousing pump means being adjusted in such a manner that, after the filling of one mold, and one of the dousing pump means continues to operate and by the provision of a second shut-off means connected with the mixing means discharge conduit by an additional conduit means which opens when the shut-off device means is closed, provides an outlet for the material supplied by the dousing pump means which continues to operate.

References Cited by the Examiner

UNITED STATES PATENTS

| | | | |
|---|---|---|---|
| 2,505,799 | 5/1950 | Smith | 222—135 |
| 2,946,488 | 7/1960 | Kraft | 222—137 |
| 3,071,293 | 1/1963 | Lewis-Smith et al. | 222—135 |

FOREIGN PATENTS 816,093  7/1959  Great Britain.

LOUIS J. DEMBO, Primary Examiner.

HADD S. LANE, Examiner.